United States Patent [19]

Costley

[11] 4,213,024
[45] Jul. 15, 1980

[54] BUTT WELDING PROCESS

[75] Inventor: Eugene J. Costley, Coos Bay, Oreg.

[73] Assignee: JDC Welding and Research, Inc., Coos Bay, Oreg.

[21] Appl. No.: 930,992

[22] Filed: Aug. 4, 1978

Related U.S. Application Data

[63] Continuation-in-part of Ser. No. 755,080, Dec. 28, 1976, abandoned.

[51] Int. Cl.² ............................................. B23K 9/24
[52] U.S. Cl. ..................................... 219/61; 219/59.1; 219/106; 219/137 R
[58] Field of Search ................ 219/59.1, 61, 104, 106, 219/137 R, 219, 61.3, 61.4, 70, 145.1

[56] References Cited

U.S. PATENT DOCUMENTS

| | | | |
|---|---|---|---|
| 2,182,796 | 12/1939 | Deming | 219/106 X |
| 2,792,490 | 5/1957 | Risch | 219/61 X |
| 3,140,385 | 7/1964 | Johnston | 219/137 R |
| 3,497,662 | 2/1970 | Rudd | 219/106 |
| 3,585,345 | 6/1971 | Jesperson | 219/106 X |
| 3,670,140 | 6/1972 | Roberts | 219/137 R |

*Primary Examiner*—Richard R. Kucia
*Attorney, Agent, or Firm*—Kolisch, Hartwell, Dickinson & Stuart

[57] ABSTRACT

A method for butt welding pipe sections together wherein each pipe section has a beveled end includes positioning the pipe sections adjacent one another so that the beveled ends define a weld groove and locating filler material of elongate dimension having a triangular cross-section so that an edge portion thereof protrudes through the weld groove. The filler material is fused to the weld groove by striking an inert gas-shielded arc between a Heliarc torch electrode and the beveled ends and advancing the electrode relative to the filler material so that a weld bead is formed having a convex profile on the interior surfaces of the pipe sections adjacent the weld groove.

2 Claims, 8 Drawing Figures

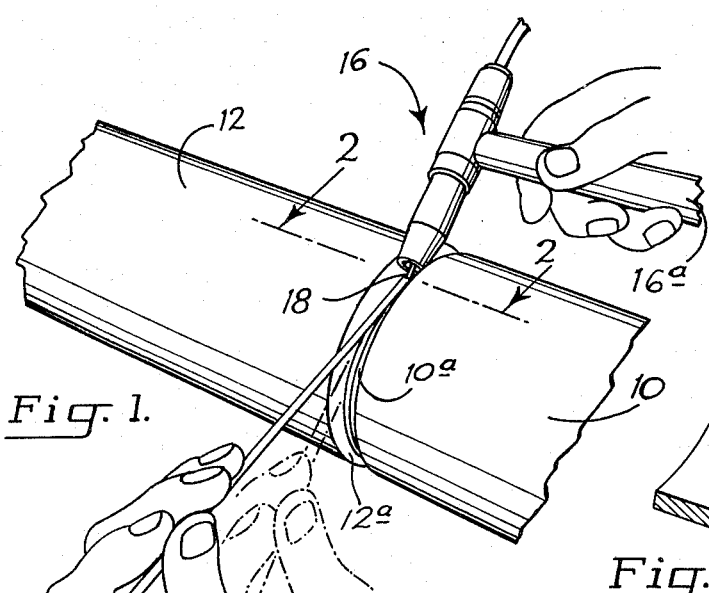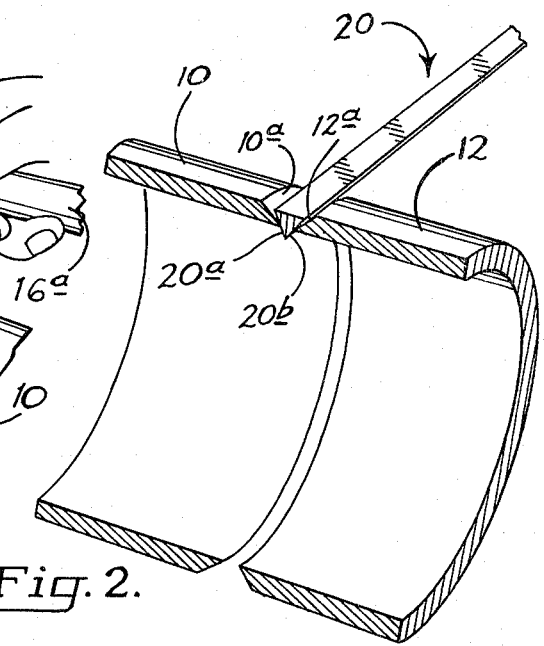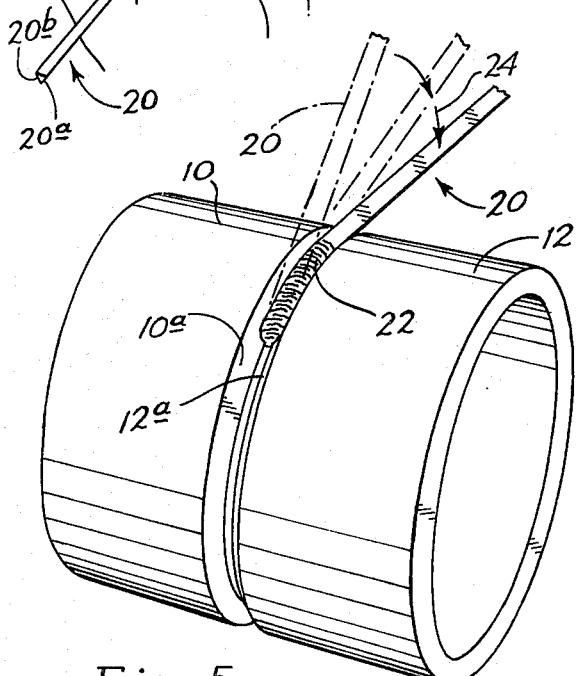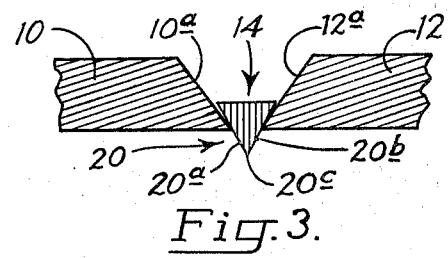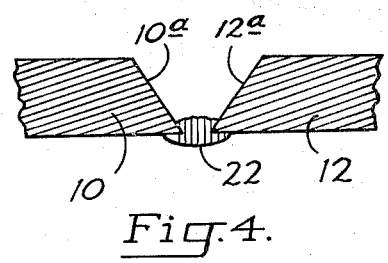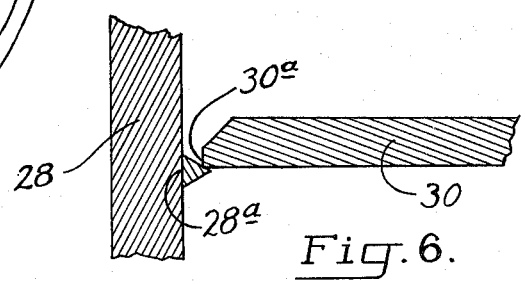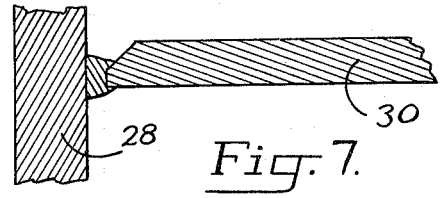

BUTT WELDING PROCESS

BACKGROUND AND SUMMARY OF THE INVENTION

This is a continuation-in-part of Application Serial No. 755,080 filed Dec. 28, 1976 now abandoned.

The present invention relates to welding process, and more particularly to a novel method using inert gas-shielded are welding (Heliarc) for open butt welding pipe sections or plate material together.

A conventional method for butt welding pipe sections includes positioning beveled ends of the pipe sections adjacent one another and locating a cylindrical welding rod in a weld groove defined between the beveled ends. An arc is then struck between the electrode of a Heliarc torch and the weld groove so that the welding rod is melted thereby forming a joint between the pipe sections. However, because the cylindrical welding rod is circular in cross-section, it is not possible for the welding rod to penetrate through the interior gap of the weld groove. Thus, in order to ensure adequate formation of a weld bead on the inside surfaces of the pipe adjacent the weld groove, a consumable ring or backing member is provided on the inside of the pipe sections running in a circumferential direction adjacent the weld groove. The backing member provides additional filler material ensuring that a convex bead is formed on the inside surfaces of the pipe sections adjacent the weld groove.

While the backing member may provide additional filler material necessary for an acceptable weld, it can be appreciated that substantial fit-up time is necessary to locate the backing member in suitable position. Additionally, depending on the size of the pipe sections, fit-up of a backing member may be extremely tedious. For these reasons, it is apparent that it would be advantageous to provide a method for butt welding adjacent pipe sections together which did not require the use of a backing member.

Considering another problem, with the conventional method as described above, it can be appreciated that the pipe sections will tend to be drawn together during welding because of metal expansion. As the pipe sections are drawn together, the cylindrical welding rod is urged upwardly in the weld groove and the gap between the pipe sections decreases thereby preventing adequate penetration of filler material through the weld groove. This is referred to as "suck back" and results in a concave profile of the weld bead because the weld groove is pulled together.

In order to prevent "suck back", the conventional method as described above contemplates the use of mechanical restraints secured to the pipe sections to prevent them from being drawn toward one another. The necessity of such restraints increases fit-up time and adds additional costs.

Accordingly, it is an object of the present invention to provide a method for open butt welding pipe sections together which contemplates locating filler material of elongate dimension having a triangular cross-section so that an edge portion thereof projects through the weld groove defined by opposed beveled ends of the pipe sections. Fusing of the filler material to the weld groove is accomplished by striking an inert gas-shielded arc between a torch electrode and the beveled ends while advancing the electrode relative to the filler material. In this manner, a weld puddle or bead is formed and it is only necessary to deform the filler material so that an edge portion thereof is continuously projected through the weld groove while simultaneously advancing the electrode. Because an edge of the triangular cross-section is extended through the weld groove during welding, a "wedging" action results which prevents the pipe sections from being pulled or drawn together due to heat expansion. As an added benefit, a weld bead is formed which includes a convex profile on the interior surfaces of the pipe sections directly beneath the weld groove.

Another object of the present invention is to provide a method for butt welding in which fusing of the filler material occurs without feeding the filler material toward the electrode. Stated in another way, once a puddle has been formed, the filler material is deformed by urging or bending it toward the weld groove so that an edge portion of the filler material protrudes or extends through the weld groove. The deforming of the filler material may be manually accomplished because application of the electrode forms a puddle about which the filler material may be deformed.

Still another object of the present invention is to provide a method for butt welding pipe sections in which the triangular cross-section of the filler material defines an angle between adjacent sides of the cross-section which is less than the angle which would be formed between the beveled ends of the pipe sections if the beveled ends were extended (as viewed in profile) to meet at a vertex. This construction results in increased wedging action of the filler material and ensures that the edge of the filler material may be continuously urged so as to protrude through the weld groove and extend into the interior of the pipe sections.

These and additional objects and advantages of the present invention will be more readily understood from a consideration of the drawings and the following detailed description of the preferred embodiment of the invention.

BRIEF DESCRIPTION OF THE DRAWINGS

FIG. 1 is a perspective view of a pair of pipe sections being butt welded together according to the method of the present invention using an inert gas-shielded arc for fusing filler material to the weld groove;

FIG. 2 is an enlarged view taken along lines 2—2 of FIG. 1 and illustrates placement of filler material of elongate dimension having a triangular cross-section in the weld groove;

FIG. 3 is an enlarged view of a portion of FIG. 2 illustrating location of the filler material in the weld groove as viewed when facing directly toward the weld groove;

FIG. 4 is a view, similar to FIG. 3, illustrating a resultant bead layed up in the groove after the filler material has been fused to the weld groove by striking an inert gas-shielded arc;

FIG. 5 is a view, similar to FIG. 2, illustrating deforming of the filler material during advancing of a torch electrode (the torch electrode being deleted for purposes of clarity).

FIG. 6 is a side elevation view illustrating the use of filler material inserted in a weld joint according to the present invention prior to its being fused to a pair of plates;

FIG. 7 is a view of the plates of FIG. 6 after the filler material has been fused to create a welded joint; and FIG. 8 is a cross-sectional view illustrating positioning of a conventional cylindrical welding rod in a weld groove of pipe sections.

DETAILED DESCRIPTION OF THE PREFERRED EMBODIMENT

Turning now to the drawings, reference is initially directed to FIG. 1 which generally illustrates a method for butt welding pipe sections together according to the present invention. More specifically, a pipe section 10 is shown positioned adjacent a pipe section 12 with beveled ends of the pipe sections positioned for defining a weld groove. As can be seen in FIGS. 1—3, pipe section 10 is provided with a beveled end 10a and pipe section 12 is provided with a beveled end 12a. The beveled ends, when the pipe sections are positioned adjacent each other, define a weld groove generally indicated at 14. Pipe sections 10, 12 are positioned so that weld groove 14 includes a gap opening into the interior of the pipe sections.

As shown in FIG. 1, a Heliarc torch, generally indicated at 16, is held by a welder's right hand during a welding sequence so that an electrode 18 is positioned in weld groove 14. The torch is of conventional construction and includes a handle 16a which also provides a passage for conducting the inert gas. The welder's left hand is shown holding and locating filler material, generally indicated at 20, of elongate dimension having a triangular cross-section with an edge portion thereof penetrating or projecting through weld groove 14. Filler material 20 is shown projecting through weld groove 14 more clearly in FIGS. 2 and 3. It can be seen that filler material 20 is of triangular cross-section and is located so that sides 20a, 20b protrude through weld groove 14 with vertex 20c (and an edge portion extending therefrom) projecting beneath the interior surfaces of the pipe sections. Generally, it is contemplated that the angle formed between sides 20a, 20b of filler material 20 is less than the angle which would be defined between beveled ends 10a, 12a were the beveled ends (when viewed in profile) extended to a vertex. This construction is clearly shown in FIG. 3.

Reference is now directed to FIGS. 2 and 5 as well as to FIG. 1 in order to describe the method of the present invention for butt welding the pipe sections together. Initially, the pipe sections are positioned adjacent one another so that a gap is provided between beveled ends 10a, 12a. Next, the welder positions filler material 20 so that an edge portion thereof, extending from vertex 20c, projects through weld groove 14. Torch 16 is suitably positioned with electrode 18 adjacent the filler material and the beveled ends so that an inert gas-shielded arc is struck between the beveled ends. The arc melts down the filler material and as torch 16 is progressed to the left in FIG. 1 (to the right in FIG. 5) a weld puddle resulting in a bead 22 is created which fuses filler material 20 to weld groove 14. Electrode 18 is advanced toward the unmelted portion of filler material 20 while the welder simultaneously deforms the filler material so that an edge portion thereof continuously projects through weld groove 14.

The deforming of filler material may be clearly seen from a consideration of FIGS. 1 and 5. As shown in FIG. 1, as electrode 18 of torch 16 is advanced toward the left, the welder's left hand deforms filler material 20 by angularly displacing the filler material about the weld puddle simultaneously during formation thereof. This is also shown in FIG. 5 where the angular displacement is represented by arc 24. The inital position of the filler material is shown in dot-dash at 20 and as the weld puddle is formed, the filler material is progressively angularly displaced downwardly so that an edge portion (extending along vertex 20c as shown in FIG. 3) is continuously moved so as to protrude through weld groove 14.

It must be appreciated that filler material 20 is not fed into contact with electrode 18 as is the case in the prior art. Rather, the filler material is deformed or angularly displaced about the weld puddle in a path tracking the circumference of the weld groove as electrode 18 is advanced toward the opposite end of the filler material. The result is that an edge portion of the filler material is continuously being urged into the weld groove so that an adequate amount of filler material extends beneath the interior surfaces of pipe sections 10, 12. As shown in FIG. 4, sufficient filler material is provided so as to create a convex profile on the inner surfaces of the pipe sections. In addition, protrusion of the filler material through weld groove 14 is ensured due to the "wedging" action caused by extending vertex 20c (and the edge therealong) through the weld groove so that the pipe sections will not be drawn together. Wedging action is accomplished by virtue of sides 20a, 20b being urged between the edges of beveled ends 10a, 12a. "Suck back" of filler material is substantially eliminated The above described wedging action would not occur with the use of cylindrical filler material such as a welding rod 26 shown in FIG. 8. More specifically, it can be seen that welding rod 26 will not extend through the gap provided in the weld groove. Thus, during fusing of welding rod 26 to the pipe sections, the pipe sections will move or be drawn toward one another. The use of restraints to maintain the orientation of the pipe sections is mandated. Additionally, it can be seen that welding rod 26 will not extend through the gap at the bottom of the weld groove and thus adequate penetration of fused material will not be present so as to form a convex bead. While welding rod 26 may be constructed of a size of sufficiently small diameter so as to extend through the gap in the bottom of the weld groove, it can be appreciated that upon striking an arc and advancing a torch electrode, it will be impossible to provide wedging action as contemplated by the method of the present invention. This is because the cylindrical cross-section may not be wedged in the gap provided at the bottom of the weld groove. Rather, as the pipe sections are drawn together, the welding rod would tend to slip upwardly into the weld groove.

The use of filler material having a triangular cross-section and the method of the present invention is contemplated primarily for use in the first pass only. Stated differently, it is critical that a proper bead with a convex profile, be laid up the weld groove initially. Thereafter, cylindrical welding rod may be used to fuse the remaining portion of beveled ends 10a, 12b together Turning now to FIG. 6 and 7, there is generally illustrated the use of the method of the present invention in butt welding a pair of plates together. As shown in side elevation view, a plate 28 is positioned adjacent another plate 30. Filler material of elongate dimension and triangular cross-section is inserted in the weld groove and an appropriate inert gas-shielded arc is struck. The result is the bead shown in FIG. 7 which includes convex portions. It is to be appreciated that by the use of a filler material having triangular cross-section, penetration of filler material may be ensured so as to protrude through the weld groove. Once again, if a cylindrical welding rod were used, adequate heat placement adjacent opposed surfaces 28a, 30a would not be provided. By use of the filler material and the method of the present invention, heat placement will be provided adjacent the weld groove so that a strong bead entirely covering surface 30a results.

From the above description, and with reference particularly to pipe sections, it can be seen that the present invention provides several distinct advantages. For instance, it can be seen that the method of the present invention eliminates the need for consumable rings or backing members provided on the interior surface of the pipe sections adjacent the weld groove. This is due to the use of the filler material having a triangular cross-section according to the present invention which ensures penetration of filler material through the weld groove. As a consequence, as the filler material is fused to the beveled ends of the pipe sections, sufficient filler material forms as a bead having a convex profile on the interior surfaces.

Additionally, "wedging" action of the filler material prevents the pipe sections from being drawn together during welding. The wedging action is accomplished by the welder deforming or angularly displacing the filler material about the continuous weld puddle or bead being formed so that an edge portion of the filler material is continuously inserted through the weld groove. Any tendency of the pipe sections to be drawn together is resisted by sides 20a, 20b of the filler material as it is wedged into the weld groove. In addition, the wedging action is increased due to the fact that sides 20a, 20b define an angle which is less than the angle formed by the beveled ends. There is absolutely no tendency for an inserted edge portion of the filler material to ride up out of the weld groove.

The use of restraints to prevent the pipe sections from being drawn together is eliminated. Certainly, it can be seen that substantial fit-up time and costs as well as material outlays for mechanical restraints are no longer necessary.

While the present invention has been particularly shown and described with reference to the foregoing preferred embodiment, it will be understood by those skilled in the art that other changes in form and detail may be made without departing from the spirit and scope of the invention as defined in the appended claims.

It is claimed and desired to secure by Letters Patent:

1. A method for butt welding pipe sections together, each pipe section having a beveled end, comprising:
    positioning the pipe sections adjacent one another so that the beveled ends define a weld groove;
    locating filler material of elongate dimension having a triangular cross-section so that an edge portion thereof protrudes through the weld groove;
    fusing said filler material to said weld groove by striking an inert gas-shielded arc between an electrode and the beveled ends and advancing the electrode relative to said filler material so that a weld bead is formed; and
    progressively angularly displacing said filler material about the weld puddle, simultaneously during advancement of the electrode, so that an edge portion of said filler material protrudes through said weld groove to thereby maintain a gap at the bottom of the weld groove.

2. The method of claim 1 wherein said filler material is provided with a triangular cross-section having an angle, between adjacent sides, which is less than the angle which would be formed between the beveled ends of the pipe sections should the beveled ends be projected to meet at a vertex.

* * * * *